W. R. WILSON.
HUB STRUCTURE FOR ROLLER BEARINGS.
APPLICATION FILED NOV. 20, 1917.

1,277,517.

Patented Sept. 3, 1918.

INVENTOR
WILLIAM R. WILSON.

BY
Lockwood & Lockwood
ATTORNEYS

UNITED STATES PATENT OFFICE.

WILLIAM R. WILSON, OF TERRE HAUTE, INDIANA.

HUB STRUCTURE FOR ROLLER-BEARINGS.

1,277,517.  Specification of Letters Patent.  Patented Sept. 3, 1918.

Application filed November 20, 1917. Serial No. 202,834.

*To all whom it may concern:*

Be it known that I, WILLIAM R. WILSON, a citizen of the United States, and a resident of Terre Haute, county of Vigo, and State of Indiana, have invented a certain new and useful Hub Structure for Roller-Bearings; and I do hereby declare that the following is a full, clear, and exact description thereof, reference being had to the accompanying drawings, in which like letters refer to like parts.

This invention relates to bearing structures for wheel hubs, journal boxes, pillow blocks and the like and a feature of the invention is the provision of means for holding bearing rollers within the hub or boxing and at the same time provide an oil retaining receptacle within the hub.

A further feature of the invention is the provision of a bearing surface for the supporting retainers for the ends of the bearing rollers. A further feature of the invention is the provision of means for preventing the lubricant from leaving the bearing after once being introduced thereinto.

A further feature of the invention is the provision of means for introducing lubricant into the bearing. A further feature of the invention is the provision of a closing means for the ends of the hub or bearing, and a further feature of the invention is the provision of a reservoir within the hub or bearing for the reception of lubricant.

The full nature of the invention will be understood from the accompanying drawings and the following description and claims.

Figure 1:
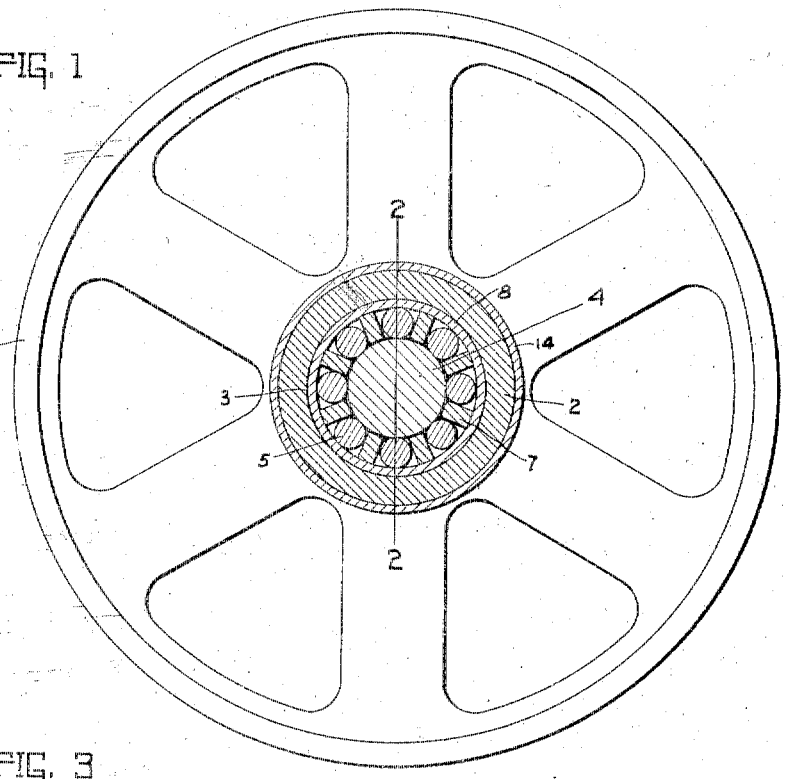
Figure 3:
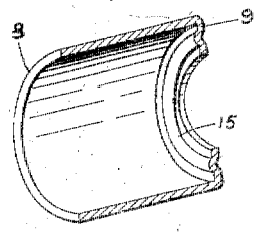
Figure 4:
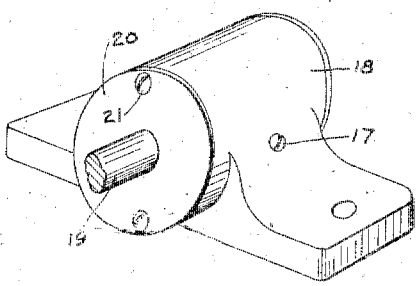
Figure 2:
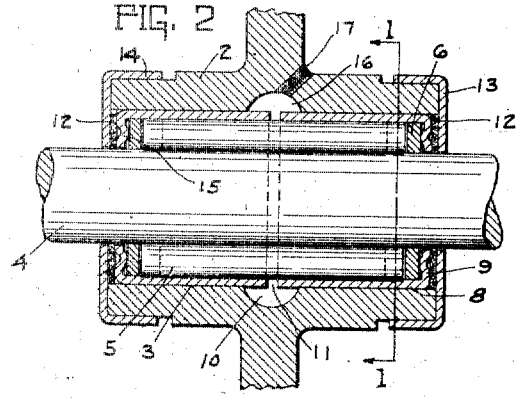

Figure 1 is a side elevation of a wheel showing the hub, axle and bearing therefor in section, said section being on line 1—1 of Fig. 2. Fig. 2 is a sectional view as seen on line 2—2 of Fig. 1. Fig. 3 is a sectional perspective view of a bushing used in connection with the bearing mechanism. Fig. 4 is a perspective view of a pillow block showing the manner of applying the bearing structure thereto.

Referring to the drawings in which similar reference numerals designate corresponding parts throughout the several views, 1 indicates a wheel which may be constructed in any preferred manner, but in the present instance of that class used in connection with mine cars, trucks and the like and 2 indicates the hub thereof, said hub having a central bore 3 through which extends an axle 4. In order to provide a suitable roller bearing for the hub of the wheel, a plurality of bearing rollers 5 are positioned around the axle 4 and are held in proper spaced relation by means of retainer members 6 which are substantially in the form of a washer and provided with a plurality of plate-like fingers 7 which project inwardly between the ends of the bearing rollers.

In order to adapt the bearing for use in connection with hubs having bores of varying diameters, a casing is provided for the bearing rollers and retainer members comprising bushings 8 which are preferably arranged in pairs, the outer ends of the bushings having inwardly extending integral flanges 9 which form closures for the ends of the bushings and when the bushings are introduced into the hub, the bearing rollers and retaining members are entirely inclosed.

The interior of the hub 2 is provided at its longitudinal center with a peripheral channel 10 which forms a reservoir for lubricant and by so constructing the bushings that when properly introduced into the hub, they will remain slightly spaced apart at their inner ends, a narrow feed opening 11 is provided through which the lubricant may pass from the channel 10 into engagement with the bearing rollers 5.

When the lubricant enters the bushings 8 the flange 9 at the ends thereof will normally prevent the lubricant from leaving the bearing at the ends of the hub, but to fully guard against any oil being carried out of the hub along the axle 4, a fabric washer 12 of any suitable material, is introduced around the axle and pressed against the outer face of the flange 9 so that should any small particles of the lubricant be carried out of the bushing by the axle, the washers 12 at the ends of the bushing will absorb such lubricant.

The closed ends of the bushings 8 preferably project inwardly beyond the ends of the hub a sufficient distance to provide a space for the reception of the washers 12 and in order to securely hold the washers in position and at the same time form a complete closure for the ends of the hub, caps 13 are introduced over the ends of the hub and the flanges 14 on the caps then shrunk upon the hub so as to securely hold the caps in position. In order to provide a frictional surface for the retaining members 6, the flanges 9 of the bushings are struck in to form circular ribs 15 against which the outer faces of the retainer members 6 rest, when assembled in the bushing. In addition to forming a very small bearing surface for the members 6, said ribs 15 hold the retaining members so spaced as to form pockets into which lubricant will be deposited and furnish a constant lubricant therefor.

Instead, however, of forming the ribs as shown any suitable means may be provided for engagement with the retaining members. The hub 2 is provided at a suitable point with a port 16 through which lubricant may be introduced into the channel 10, any suitable form of closure being provided for the port, such as a screw 17.

In Fig. 4 of the drawing the bearing means is shown applied to a pillow block 18 through which extends a shaft 19 and instead of providing a cap for each end of the block, having a flange for engagement with the outer surface of the block, plates 20 may be introduced over the ends of the block and secured thereto by means of screws 21.

Although but two forms are shown for securing the covering means over the ends of the hub or block, it will be readily seen that any suitable device may be employed which will accomplish the proper results and be secured to the hub in any suitable manner. This form of device is primarily adapted for use in connection with farm machinery, mine cars, wagons, journal boxes, pulley blocks and the like and also in connection with idle pulleys which receive a great deal of wear and the prime feature of the invention is the cheapness at which it can be produced and at the same time give entirely satisfactory results.

It will be clearly understood that by increasing the size of the bearing rollers and likewise the size of the bushings, a wheel having a hub opening of much greater diameter than the diameter of the axle or shaft upon which it is to be mounted, may be readily accommodated and caused to properly fit around the axle.

In assembling the parts of the bearing structure, one of the bushings is first introduced into the hub member and one of the retaining members then introduced into the hub and said bushing, one end of the rollers then engaged with said retaining member and the other retaining member then engaged with the opposite ends of the rollers and the opposite bushing then positioned in the hub. When the parts are so assembled it will be impossible for the rollers to become disengaged from the retaining members. The washers 12 are then introduced into place and the caps 13 then introduced over the ends of the hub and secured thereto. The hub is then introduced over the axle or such other bearing with which the same may be used.

The invention claimed is:

1. The combination with a hub structure, a plurality of bearing rollers therein, and means to space the rollers in said hub structure, of a bushing adapted to be introduced in each end of the hub structure between the hub and said bearing rollers, the inner ends of said bushings being spaced apart to form an opening, inwardly extending flanges at the outer ends of the bushing, and means engaging the ends of the hub for closing the ends thereof.

2. The combination with a hub structure, and bearing rollers adapted to be introduced thereinto, of a bushing adapted to be introduced into each end of the hub structure to form a bearing for said rollers, a fabric washer at the outer ends of said bushings, and means to close the ends of the hub whereby lubricant will be prevented from leaving the hub.

3. The combination with a hub structure having a bore therethrough, said bore having a peripheral channel at its longitudinal center, of a pair of bushings adapted to be introduced into the hub structure, the inner ends of said bushings being spaced apart for forming a feeding opening between said channel and the interior of the bushings, means to close the outer ends of the bushings, and means to prevent leakage of oil from said bushings.

4. The combination with a hub structure, a plurality of roller bearings coöperating therewith, and retaining members at the ends of said rollers for holding the same in spaced relation, of a rib formed at the outer end of each bushing against which the spacing means for the rollers is adapted to rest, and fibrous means for preventing the escape of lubricant from the hub member.

5. The combination with a hub structure having an interior channel peripherally thereof, and means for introducing oil into said channel, of a pair of bushings adapted to fit in said hub member and spaced apart at their inner ends to form a passage for lubricant from said channel to the interior of the bushing, a plurality of bearing rollers incased in the bushings, retainer members at the ends of the bearing rollers, inwardly extending flanges at the outer ends of the bushings and ribs on said flanges for engagement with the retainer members whereby a minimum frictional surface will be presented to said retaining member.

In witness whereof, I have hereunto affixed my signature in the presence of the witnesses herein named.

WILLIAM R. WILSON.

Witnesses:
Lois K. Moore,
Emmet P. Hughes.